United States Patent

[11] 3,630,549

| [72] | Inventor | John A. Grimm |
| | | Bellvue, Colo. 80512 |
| [21] | Appl. No. | 5,041 |
| [22] | Filed | Jan. 22, 1970 |
| [45] | Patented | Dec. 28, 1971 |

[54] FRAME AND CLEAT JOINT CONNECTOR FOR DUCTS
1 Claim, 23 Drawing Figs.

[52] U.S. Cl. .................................................. 285/297, 285/364, 285/398, 285/424
[51] Int. Cl. ........................................................ F16p 13/12
[50] Field of Search ........................................... 285/297, 371, 398, 424, 364; 52/464, 468

[56] References Cited
UNITED STATES PATENTS

| 1,385,217 | 7/1921 | Lutz ............................. | 52/464 |
| 2,114,791 | 4/1938 | Williams ...................... | 52/464 |
| 2,171,319 | 8/1939 | Williams ...................... | 52/464 |
| 2,552,865 | 5/1951 | Radnall ........................ | 52/464 |
| 3,028,938 | 4/1962 | Schorr .......................... | 52/464 |
| 3,198,561 | 8/1965 | Witt .............................. | 285/364 |
| 3,199,901 | 8/1965 | Jepsson ........................ | 285/364 |

FOREIGN PATENTS

| 652,666 | 12/1964 | Belgium ....................... | 285/424 |

*Primary Examiner*—Reinaldo P. Machaldo
*Attorney*—Drake and Crandell

ABSTRACT: Duct joint connectors are provided, for sheet metal ducts, air conduits and the like, by forming a rectangular inner frame from stock frame material, positioning the ducts in place against the frame, and securing the ducts to the frame by means of external cleats. For rectangular ducts, the corners are enclosed by end caps. Sealing gaskets or mastic may be utilized to seal air gaps between the ducts and the frame.

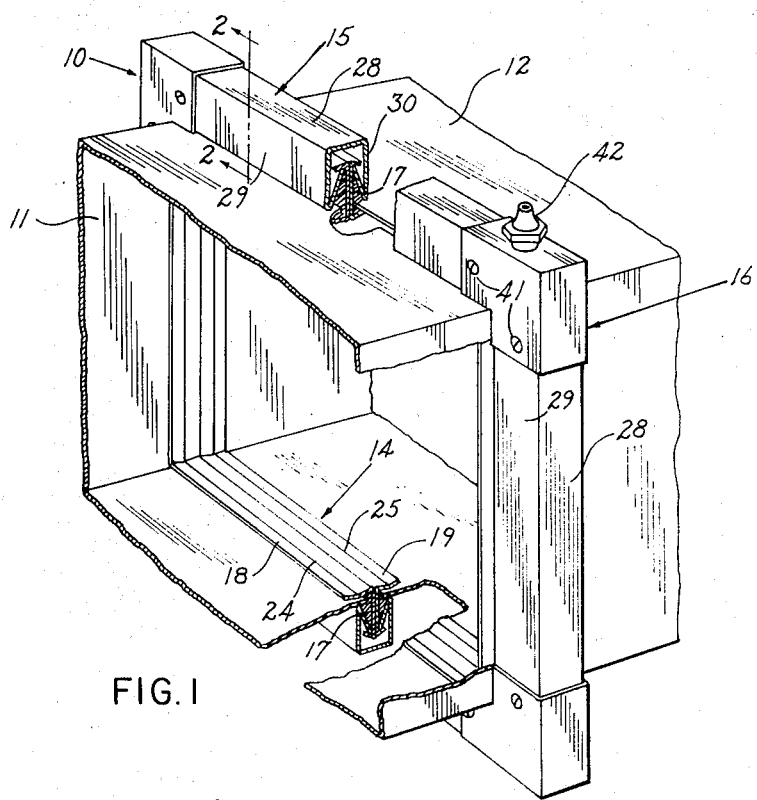
FIG. 1
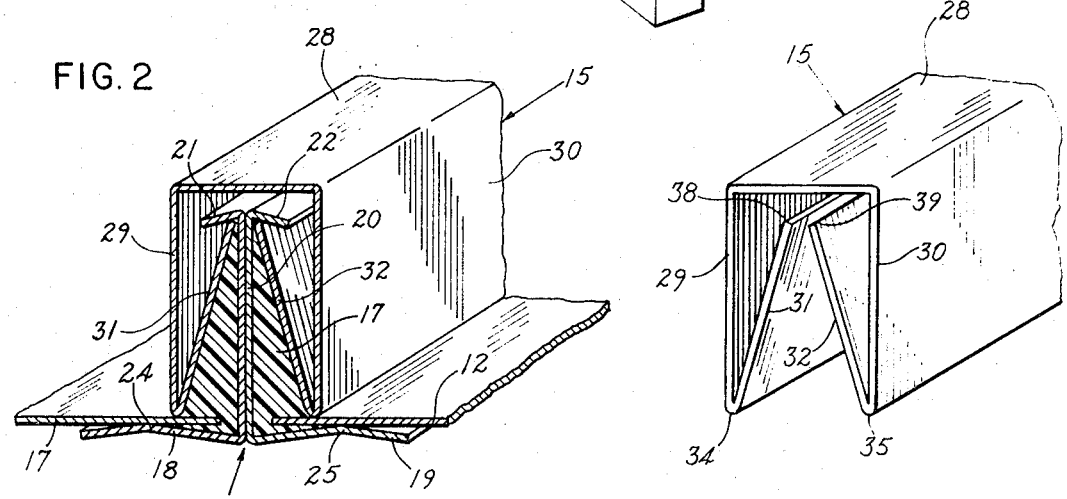
FIG. 2
FIG. 3
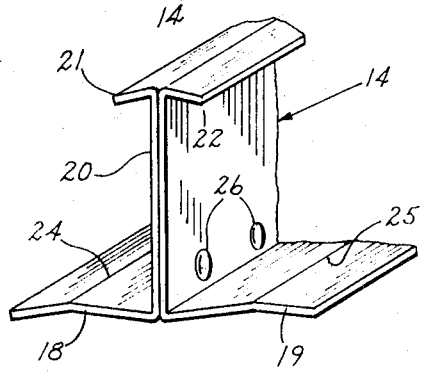
FIG. 4
INVENTOR
JOHN A. GRIMM
BY
Drake and Crandell
ATTORNEYS

PATENTED DEC 28 1971 3,630,549

INVENTOR
JOHN A. GRIMM
BY
Drake and Crandell
ATTORNEYS

INVENTOR
JOHN A. GRIMM
BY
*Drake and Crandell*
ATTORNEYS

1

FRAME AND CLEAT JOINT CONNECTOR FOR DUCTS

BACKGROUND OF THE INVENTION

The present invention relates to the field of connector joints for ducts, and more particularly to sealed connector joints for ducts adapted to carry air or other gases under pressure.

A wide variety of duct joint connectors and like coupling constructions are known in the art. For example, S-type channel or cleat couplings, adapted to receive inserted ends of ducts, are shown in U.S. Pat. No. 3,246,918 issued Apr. 19, 1966, to G. L. Burghart, and U.S. Pat. No. 1,935,690, issued Nov. 21, 1933, to H. J. Zack. Opposed channel cleat couplings, sometimes referred to as slip joint connectors, are shown in U.S. Pat. No. 2,498,753, issued Feb. 28, 1950, to F. Deitsch, U.S. Pat. No. 2,360,159, issued Oct. 10, 1944, to R. E. Peck, and U.S. Pat. No. 1,450,826, issued Apr. 3, 1923, to M. Walten. It is also known to form the ends of adjacent ducts with reverse-bent flanges, and slip a slotted cleat over the duct flanges to hold the ducts together as shown in U.S. Pat. No. 1,935,690 mentioned above. The use of sealing mastic for pipe joint connections is known in the art and is shown for example in U.S. Pat. No. 2,271,549 issued Feb. 3, 1942, to A. Henderson in U.S. Pat. No. 2,313,074, issued Mar. 9, 1943, to H. W. Jewell, and in U.S. Pat. No. 3,387,864, issued June 11, 1968, to J. M. Walters.

OBJECTS OF THE INVENTION

The principal object of the present invention is to simplify the joint construction for air ducts and like conduits, and to strengthen and improve the joint construction and seal.

Another object of the invention is to provide a duct joint construction of the foregoing character which may be assembled with substantially less time, effort and labor costs than known duct connector constructions.

A further object is to increase the pressure capacity and reduce the leakage of duct joints, as well as provide stiffer duct joints and thereby rigidify the entire duct assembly.

A further object of the invention is to enhance the ease of installation, durability and serviceability of the duct connectors and thereby of the duct system.

SUMMARY OF THE INVENTION

The foregoing objects are accomplished by the within disclosed embodiments and modifications of the present invention. Duct sections or lengths are formed to the required length and cross section. The ducts are then assembled in the field by forming, from stock materials, an inner mounting frame adapted to be positioned between two abutting duct lengths. The ducts are then tightly secured and sealed against the frame by means of external cleats which engage the frame and the exterior duct surfaces. For rectangular ducts, corner pieces are provided to enclose the corners formed between the exterior cleats and the frame, and sealing mastic may be introduced into the void formed between the cleats and the adjoining ducts. The mounting frame and cleat materials are of a standard cross section and are adapted to be readily cut to length during field installation of the ducts, thereby eliminating or minimizing the necessity of special field forming and bending tools and machines. The corners are enclosed by prefabricated stock corner pieces. Fittings may be provided in the corner pieces for the application of sealing mastic directly to the interior of the cleats. Alternatively, sealing gaskets may be utilized between the frame and the ducts. The installation of rectangular duct joint structures thus does not require the use of any special bending and forming tools, and the units may be readily installed with a minimum of skill required on behalf of the installer. Thus, the present invention facilitates a rapid, labor-saving, economical installation, and assures that the ducts will be tightly connected and pressure tight at the pressures conventionally utilized in, for example, pressure air conditioning and heating systems, and even at pressures greater than a static head of 10 inches of water.

BRIEF DESCRIPTION OF THE DRAWINGS

FIG. 1 is an isometric view, with portions cut away for clarity of illustration, showing one form of duct connector joint structure embodying the present invention.

FIG. 2 is an enlarged fragmentary section view taken substantially in the plane of line 2—2 on FIG. 1, and showing in greater detail the duct connector joint structure.

FIG. 3 is a front isometric view of a portion of the external cleat forming a part of the duct joint connector shown in FIG. 1.

FIG. 4 is an isometric view of a portion of the internal frame member forming a part of the duct joint connector structure shown in FIG. 1.

DESCRIPTION OF THE PREFERRED EMBODIMENT

Figure 5:
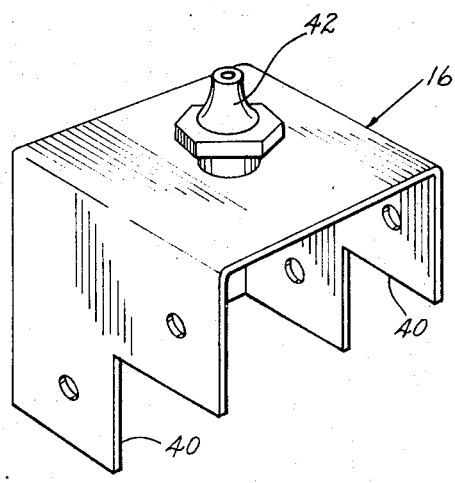
FIG. 5 is an isometric view of a corner member forming a part of the duct joint connector structure shown in FIG. 1.

Referring to FIGS. 1 through 8 of the drawings, the form of the present invention there shown comprises a duct connector construction adapted to secure together two abutting ends of generally rectangular ducts 11, 12, the duct shown being of a type adapted to carry conditioned air under a static head pressure of about 10 inches of water. The ducts 11 and 12 are conventionally formed on bending equipment in a fabricating shop or at the job site. Lengths of the rectangular duct are then connected together by connectors, such as the connector 10 embodying the present invention, to form a continuous sealed duct system. The artisan installing the duct system will know or be able to measure the duct dimensions. The duct joint connector 10, including an internal frame 14, external cleats 15, and end caps 16 can then be constructed from standard stock material. The frame stock is formed into a generally rectangular frame 14, the ducts 11 and 12 are positioned in place thereon, the cleats 15 are mounted in place to securely engage the ducts, and the end caps 16 are mounted on the cleats 15 to complete the joint connection. If desired, sealing mastic 17 may be inserted into the interior spaces formed between the cleats and the ducts to provide a tightly sealed duct joint connection.

Figure 6:
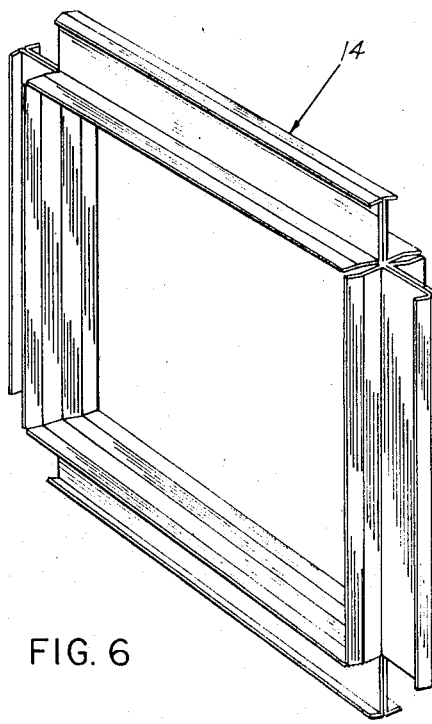
FIG. 6 is an isometric view of the frame portion of the duct joint connector structure shown in FIG. 1.

The internal frame 14 is shown more specifically in FIG. 6 and is formed to conform to duct dimensions from material which is generally T-shaped in cross section, as illustrated in FIG. 4. The T is inverted so that the crosspieces sections 18, 19 of the T engage the internal surfaces of the abutting ducts 11 and 12, and the leg 20 of the T extends outwardly between the ducts. The outer end of the leg 20 is provided with rearwardly directly inclined flanges 21, 22. The flanges 21, 22 are formed by panels which are substantially narrower than the crosspiece sections 18, 19, and extend towards the crosspiece sections at an acute angle with respect to the leg 20. The crosspiece sections 18, 19, also form a shallow acute angle with respect to the leg 20, and the outer extremities of the crosspiece sections may be slightly bent in the opposite direction to form fold lines or ridges 24, 25 for engaging the duct surfaces. To prevent the ends of the abutting ducts from being fitted too tightly against the frame legs 20 and thereby preventing the introduction of sealing mastic between the frame and the ducts, the frame leg 20 may be provided on each side with embossed buttons or spacing projections 26.

In the modification shown in FIGS. 1–8, the frame member stock is formed from two pieces of sheet metal with the leg portions 20 welded back to back to form the upstanding leg 20 of the T-shaped frame stock. Alternatively, the frame stock may be formed in an integral construction, either from sheet metal, by extrusion or by other appropriate methods. In use, the artisan installing the duct merely measures out the desired length of frame stock, and forms the same into a rectangular internal frame structure 14 as shown in FIG. 6.

After forming the frame 14, the artisan cuts cleat lengths 15 from cleat stock material having a cross section substantially as shown in FIG. 3. In this embodiment of the invention, the cleat stock comprises a downwardly directed channel having a web or cross-panel 28 and two opposed depending leg panels 29, 30. The edge panel portions 31, 32 of said leg panels 29, 30 are inturned along fold lines 34, 35, the fold lines thereby forming and defining the lower duct engaging edges of the cleat 15. The inturned panel portions 31, 32 terminate in cut edges 38, 39 positioned internally of the channel and spacedly adjacent the cross panel 28 thereof.

When the cleats 15 are slid into place against the frame 14 and abutting ducts 11 and 12, the inturned edges 38, 39 engage beneath the flanges 21, 22 of the frame, thereby causing the cleat edges 34, 35 to snugly and tightly engage the external duct surfaces. By correlating the length of the inturned panels 31, 32 with the length of the leg 20 of the T-shaped frame member, the cleats 15 can tightly and securely engage the ducts 11 and 12 against the crosspiece sections 18, 19 of the frame 14.

The corner members 16 may be of any appropriate construction. One illustrative form comprises a generally boxlike shaped corner with corner notches 40. Such a corner member 16 can be readily slipped over the exposed ends of the cleats 28 to enclose the corners of the joint. While any appropriate method may be utilized for securing the corner pieces 16 to the joint structure, the use of self-tapping metal screws 41 is one illustrative expedient as shown in FIG. 1.

Figure 7:
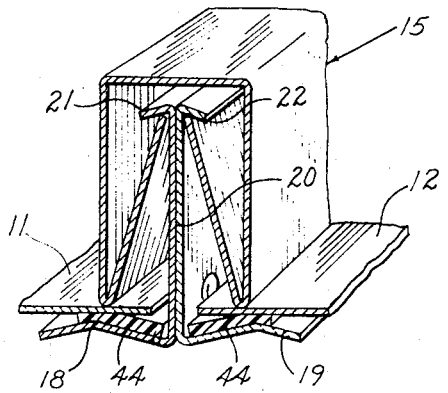
FIG. 7 is a view of the duct joint connector structure similar to FIG. 2, but illustrating the connector with sealing gaskets.
Figure 8:
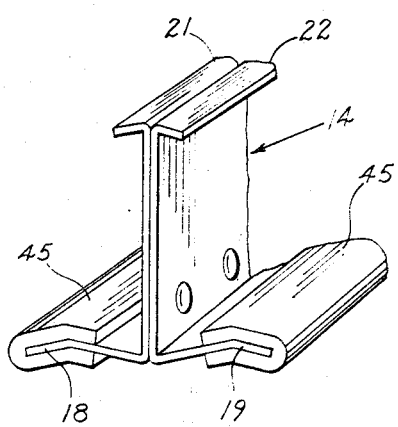
FIG. 8 is a modified form of duct joint connector frame similar to that shown in FIG. 4, but with sealing gasket members affixed directly thereto.
Figure 9:
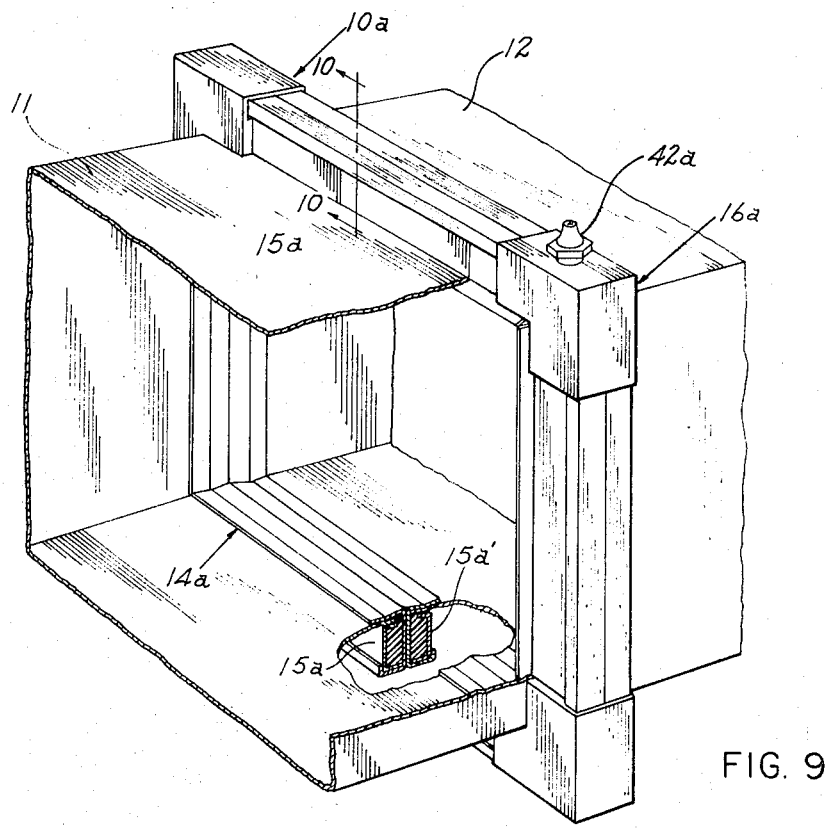
FIG. 9 is an isometric view, with portions cut away for clarity of illustration showing a modified form of duct connector joint structure embodying the present invention.

For applying a sealing mastic to the interior of the cleats and joint construction, an appropriate fitting 42 is provided on one or more of the corner pieces 16. As an alternative to the use of sealing mastic applied through a fitting 42, a gasket 44 may be interposed between the crosspiece sections 18, 19 of the frame 14 and the internal surfaces of the abutting ducts 11 and 12, as shown in FIG. 7, or gasket material 45 may be molded onto the crosspiece sections 18, 19 as a part of the stock production thereof. When the gasket constructions as shown in FIGS. 7 or 8 are utilized, it is only necessary to apply sealing mastic to the corner pieces 16. For this purpose, the corner pieces 16 may be constructed to include transverse panels blocking passage into the interiors of the adjacent cleats so as to limit the application of sealing mastic to the point immediately adjacent the duct corners. The fitting 42 may, moreover, be applied to one or more of the cleats 15. For most installations, the mastic may be of any conventional type. To obtain added strength, however, use may be made of an epoxy mixed just prior to insertion.

A modified form of duct joint connector embodying the present invention is shown in FIGS. 9 through 18. In describing this modification, reference characters similar to those utilized in the forgoing description of the form of the invention shown in FIGS. 1 through 8, will be employed with the distinguishing suffix a. Again, the artisan will form or utilize preformed lengths of duct, two sections 11, 12 of which are abutted together for the purpose of being joined. As in the previous embodiment of the invention, the modification indicated generally at 10a, is comprised of an inner frame 14a, exterior cleats 15a, 15a', two such cleats being utilized on each exterior side of the frame 14a. The open ends of the frame and cleat construction adjacent the corners of the abutting ducts are enclosed by end caps 16a.

Figure 13:
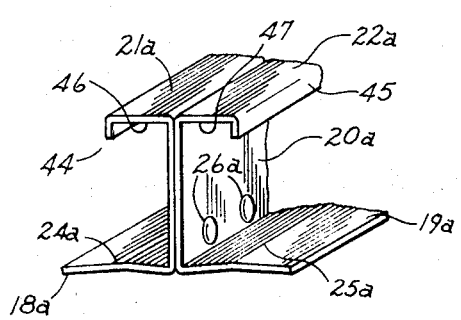
FIG. 13 is an isometric view of a portion of the internal frame member forming a part of the duct joint connector structure shown in FIG. 9.

The inner frame member 14a is constructed similarly to the frame member previously described from stock material generally T-shaped in cross section. To this end, the crosspiece of the frame stock 14a includes sections 18a and 19a, each of which is slightly bent along the fold lines 24a, 25a respectively for engagement with the interior wall surfaces of the ducts 11, 12. The main upwardly extending leg 20a of the T-shaped frame member stock is provided along its outer edge with outwardly extending flanges 21a, 22a. The flanges 21a, 22a extend generally parallel to the sections 18a, 19a of the main crosspiece of the frame, and each of the flanges 21a, 22a is provided with inturned lips or flange panels 44, 45 respectively. These lips or flange panels extend generally parallel to the main leg 20a of the frame to define inwardly directed channels 46, 47 respectively (FIG. 13). In order to keep the duct edges from abutting tightly against the main leg 20a of the T-shaped frame member, so that sealing mastic can be effectively applied, embossments or buttons 26a are provided on each side of the leg 20a adjacent the crosspiece sections 18a, 19a.

Figure 10:
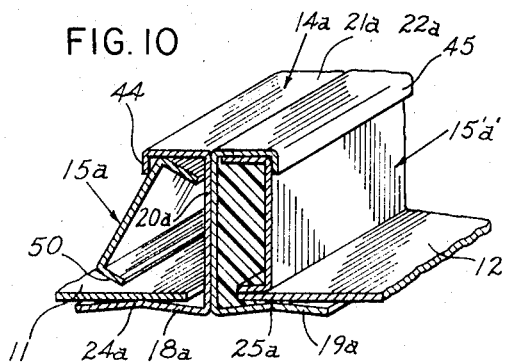
FIG. 10 is an enlarged fragmentary section view taken substantially in the plane of line 10—10 on FIG. 9 and showing the duct connector joint structure in greater detail.
Figures 11, 12:
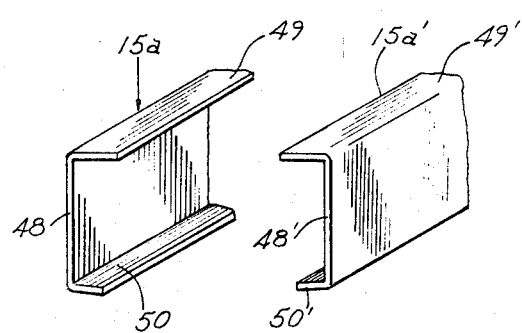
FIG. 11 is a front isometric view of a portion of the external cleat forming a part of the duct joint connector structure shown in FIG. 9.
FIG. 12 is a rear isometric view of a portion of the external cleat forming a part of duct joint connector structure shown in FIG. 9.
Figure 14:
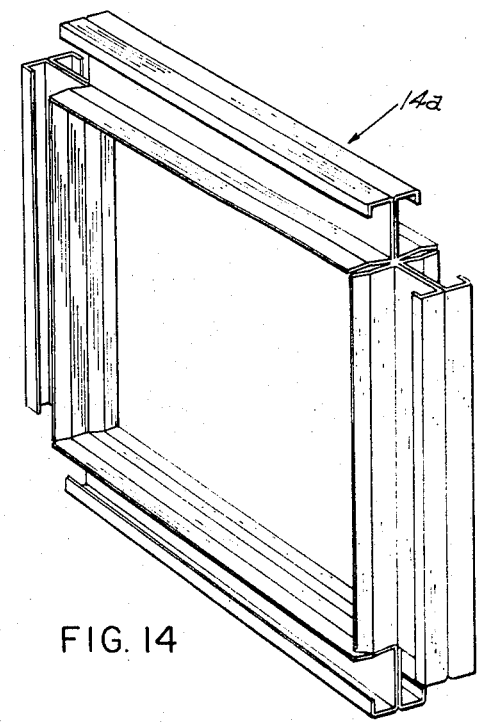
FIG. 14 is an isometric view of the frame portion of the connector structure shown in FIG. 9.

When the frame 14a has been formed to receive the ducts 11, 12, as shown in FIG. 14, the ducts are clamped rigidly in place against the frame by engagement with channel-shaped cleats 15a, 15a'. Each of these channel-shaped cleats 15a, 15a' comprises a main wall panel 48, 48 ' respectively having inwardly bent upper 49, 49' an lower 50, 50' edge panels defining a channel with the main wall panel 48, 48'. The lower ledge panel or leg 50, 50,' is somewhat shorter than the upper leg or edge panel 49, 49' in order to allow space for the embossments 26a on the T-leg 20a of the frame 14a when the channels 15a, 15a' are wedged in place, as shown in FIG. 10. The channels 15a, 15a' are mounted by inserting the upper leg 49, 49' thereof within one of the channels 46, 47 formed in the T-shaped frame member, and beneath the corresponding flange 21a, 22a of the frame 14a, by hooking the main wall of the cleat 48, 48' behind the depending flange panel 44, 45 on the frame 14a. Each channel cleat 15a, 15a' can then be wedged into place by sliding the lower edge 50, 50' thereof along the upper surface of the adjacent duct. This action securely wedges the channel 15a, 15a' underneath the overhanging flanges 21a, 22a respectively, and within the downwardly directed channels 46, 47 of the frame. The ducts 11 and 12 are thereby clamped securely to the frame 14a. This step can be readily accomplished by the use only of a hard rubber or plastic mallet. For best results, the materials of frame 14a and cleats 15a, 15a' preferably are stiffer than that of the ducts, so that the duct edge portions are bent inwardly as a result of emplacement of the cleats.

Figure 15:
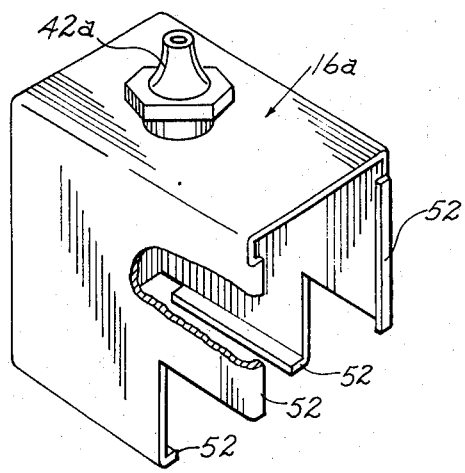
FIG. 15 is an isometric view of an end cap forming a part of the duct joint connector structure shown in FIG. 9.

In one modification, end caps 16a of the type shown in FIG. 15 are mounted in place on the open ends of the frame and cleat construction thus formed. In order to enclose the space produced by the lips or flange panels 44, 45 depending over the exterior surfaces of the main walls 48, 48' of the cleats 15a, 15a,' the end caps are provided with sidewall flanges 52 on their external edges which may be inturned to lie against the wall panels 48, 48' of the cleats. The end caps 16a may be constructed with the edges 52 inturned and the end caps snapped into place, or the edges 52 may be bent and inturned after the end caps have been positioned on the frame. In either case, the inturned lips 52 serve to securely hold the end caps 16a in place on the frame without the use of external fastening agents. For further security however, fasteners, such as self-tapping metal screws or rivets, may be utilized. After the end caps 16a have been snapped into place, mastic may be supplied to the interior voids formed in the end caps and cleats, through appropriate fittings 42a mounted on the end caps 16a.

Figure 16:
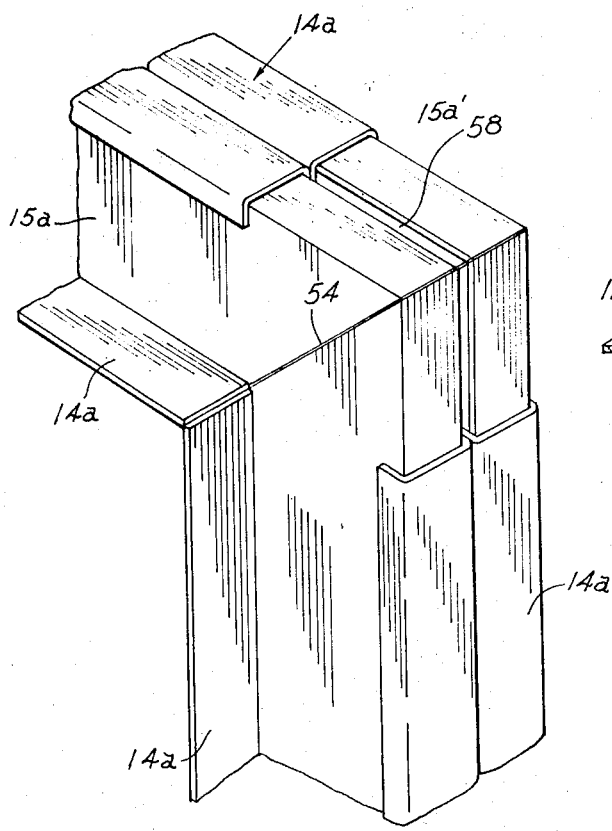
FIG. 16 is a modified form of duct joint connector structure similar to the modification shown in FIG. 9 but with mitered cleat corners.
Figure 17:
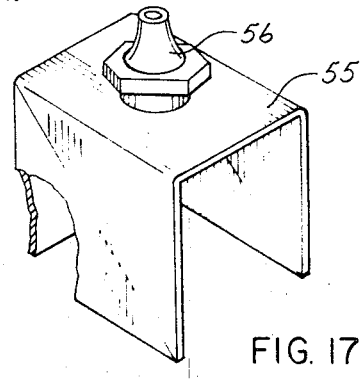
FIG. 17 is an isometric view of an end cover for use with the duct joint connector structure shown in FIG. 16.
Figure 19:
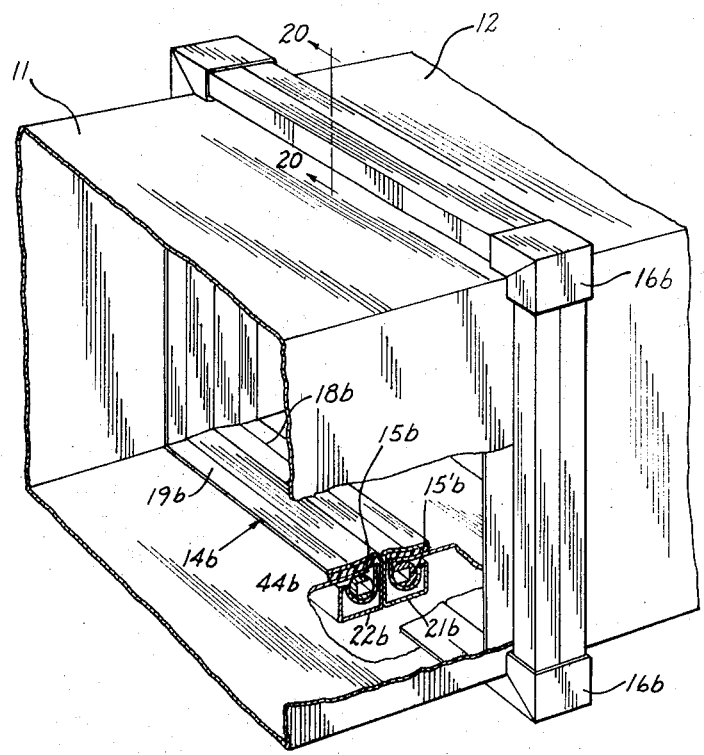
FIG. 19 is an isometric view with portions cut away for clarity of illustration of another modified form of duct connector joint structure embodying the present invention.

As an alternative, as shown in FIG. 16, the cleat members 15a, 15a' may extend beyond the ends of the frame portions 14a, and be cut along a 45° edge 54 so as to provide a mitered corner. To enclose this mitered corner, a simple boxlike end cap 55, open on two sides as shown in FIG. 17, may be readily slipped over the mitered corner and secured thereto by appropriate fasteners. The end cap 55 may also include an appropriate fitting 56 for the application of mastic to the interior of the frame and cleats through the opening 58 left between the mitered cleat corners.

Figure 18:
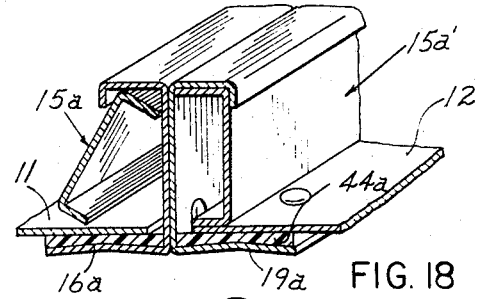
FIG. 18 is a fragmentary section view similar to the view shown in FIG. 10, but illustrating the use of sealing gaskets.

It will also be appreciated that a gasket 44a, as shown in FIG. 18, may be utilized to provide a seal between the crosspiece sections 18a, 19a of the frame 14a and the interior surfaces of the ducts 11, 12. When such a gasket is utilized, only the corners of the joint connector, either mitered or open, need be filled with mastic. Also, the frame material 14a may be provided with gaskets as shown in FIG. 8.

The modified construction shown in FIGS. 9 through 18 may be utilized in the form of a length of the T-shaped frame stock or a similar construction with the sections of the crosspieces mutually at an angle so as to provide a right or other angled connector. This permits joinder of two sheets forming a longitudinal duct corner or a bend in the duct. Analogous modifications can be made of the other embodiments herein described.

A third modified form of the present invention is illustrated in FIGS. 19 through 23 inclusive. In describing this modified form of the invention, reference characters similar to those used above will be employed where applicable with the distinguishing suffix b. As in the previously described modifications, the joint connector shown in FIGS. 19 through 23 is adapted to secure together two ducts 11, 12 and employs an inner frame 14b formed of substantially T-shaped stock material positioned between the ducts and extending outwardly therebetween where it is engaged by cleat members 15b, 15b'. The open end of the frame 14b and cleats 15b, 15b' are closed by end caps 16b which may be attached to the frame structure in any appropriate manner as described above.

The frame structure is produced from stock material which is generally T-shaped in a cross section defining a main leg 20b and a crosspiece having two opposed sections 18b, 19b. Each of the sections of the crosspiece are bent slightly to form a fold line rib 24b, 25b respectively for engaging the interior surface of the adjacent duct when the unit is clamped in place as above-described. At its outer edge, the main leg 20b of the T-shaped section is provided with out-turned flanges 21b, 22b, each of which has at its outer edge a panel 44b, 45b extending towards the corresponding section of the crosspiece 18b, 19b respectively. The panels 44b, 45b on the flanges 21b, 22b include generally circular concave channel sections 60, 61 respectively defining concave channels 62, 63 opening towards the corresponding crosspiece sections 18b, 19b for receiving cleats 15b, 15b'.

Figure 20:
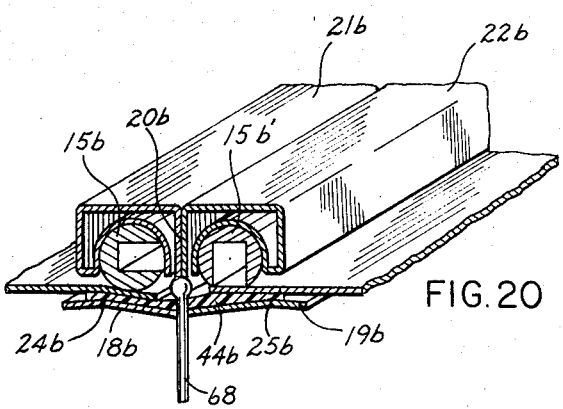
FIG. 20 is an enlarged fragmentary section view taken substantially in the plane of line 20—20 on FIG. 19, and showing a portion of the connector structure in an unclamped position.
Figure 23:
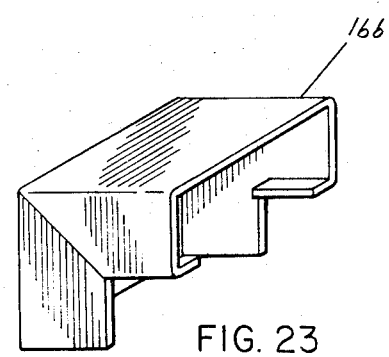
FIG. 23 is an illustrative end cap for use with the duct joint connector structure shown in FIG. 19.
Figure 21:
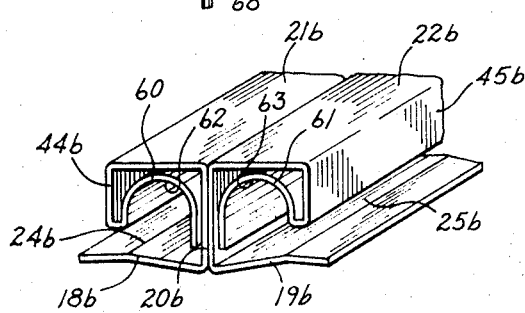
FIG. 21 is an isometric view of a portion of the internal frame member forming a part of the duct joint connector structure shown in FIG. 19.
Figure 22:
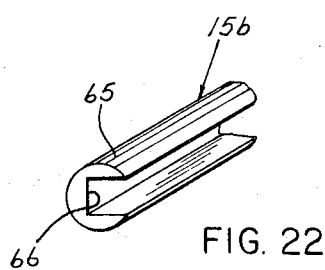
FIG. 22 is an isometric view of a portion of a cleat member forming a part of the duct joint connector structure in FIG. 19.

For securely engaging the duct walls 11, 12, tightly against the crosspiece sections 18b, 19b, cleat members 15b, 15b' are positioned in the channels 62, 63 defined in the frame. These cleat members 15b, 15b' comprise generally circularly cylindrical members 65 having a longitudinally extending radial key slot 66 defined therein. The key slot 66 is of substantial width so as to define a chordal flat on the cleat 65. Alternatively, a chordal flat may be ground on the cleat. The cleats are inserted in the channels 62, 63 with the chordal flat area juxtaposed against the adjacent duct. By utilizing a rectangular tool, the cleats may then be rotated through an approximately 90° turn, thereby to securely clamp the duct between the cleat and the underlying frame crosspiece sections 18b, 19b. A gasket 44b is conveniently employed with this modified form, although it will be appreciated that the end cap 16b may contain fittings for the application of mastic to the interior void defined in the frame member.

Where the foregoing duct joints are utilized with large size ducts, the constructions may include interior cross ties 68 extending between opposite sides of the internal frame 14, as illustrated in FIG. 20. Further, the sections 18, 19 of the crosspiece of the T-shaped internal frame 14 may be riveted or otherwise secured to the ducts.

Each of the above-described embodiments of the present invention is characterized by the fact that the frame and cleat portions of the duct joint connector are formed from stock material which would be made available to the artisan constructing the duct system. Complicated forming and bending operations in the field are completely avoided, the primary field operation being one of cutting the various frame and cleat pieces to length. A simple bending operation, which can be readily performed without the use of special tools or the like is of course required to form the generally rectangular frame. This operation is a simple one, however, and merely requires cutting the frame stock material part way through at the desired points, and bending the frame material to a rectangular shape. The end caps are prefabricated, and the artisan would merely carry a supply of appropriate end caps along with his supply of stock materials for forming the joint.

While the structural principles involved are of particular interest with respect to rectangular ducts, they also find utility in the case of round or oval ducts. In that case, however, the frame and cleat stock must be rolled or otherwise formed to effect the necessary curvature.

It will be further appreciated that the joint structures are readily susceptible of modification to produce not only transverse joint seams, but longitudinal duct seams as well. Again, appropriate end and junction caps can be readily prefabricated so that field fabrications are substantially avoided. Where longitudinal and transverse joint seams intersect, junction caps in the configuration of a cross or a T may be utilized.

Common to all the described embodiments is the cooperation between an internally supportive frame and an external cleat. As illustrated, the cleat is secured by either a snap action or a cam action. Alternatively, other clamping or fastening modes may be employed. In any case, a leading attribute of the disclosed structures is the absence of any need to preshape or otherwise form the duct edge portions being joined.

While certain illustrative forms and modifications of the present invention have been shown in the drawings and described above in considerable detail, it should be understood that there is no intention to limit the invention to the specific forms and modifications disclosed. On the contrary, it is the intention to cover all modifications, alternative constructions, equivalents and uses falling within the spirit and scope of the present invention as expressed in the appended claims.

I claim:

1. A connector joint for joining abutting sections of sheet metal ducts, comprising in combination, a frame adapted to internally support the abutting ducts in juxtaposed relation and having a portion extending outwardly between the ducts, external cleat members engaging said outwardly extending frame portions and the ducts to clamp the ducts tightly to said frame whereby said ducts are securely joined together, and external end caps enclosing corners formed by said cleats and frame, said external end caps including fitting means for use in the application of sealing mastic internally of said end caps and cleat members for sealing the connector joint.

2. For use in forming a connector joint structure for joining two sheet metal duct sections, wherein the joint structure includes an internal frame and external cleat means, a frame material comprising an elongate T-shaped member defining a crosspiece and a leg, said member being adapted to be positioned between the duct lengths to be joined with said crosspiece positioned against the internal peripheral surface of the ducts and said leg extending outwardly between said ducts, and flange means extending along the external edge of said leg for cooperative engagement with the cleat means to clamp the ducts securely between the frame and cleat means, said flange means comprising panels along the external edge of the leg and extending toward the crosspiece at an acute included angle with respect to the leg, said panels being relatively narrow with respect to the crosspiece, main panels extending outwardly along each side of the external edge of the leg substantially parallel to the crosspiece, depending edge panels on the longitudinal edge of each main panel extending towards the crosspiece, and inturned concave panels on said depending panels defining generally cylindrical cleat-receiving channels opposed to the crosspiece on each side of the leg.

3. External cleat means for use in forming a connector joint structure for joining two sheet metal duct sections, wherein said joint structure includes an internal frame and said external cleat means, and the internal frame comprises members generally T-shaped in cross section having a crosspiece and a leg with the crosspiece adapted to be positioned against the internal peripheral surfaces of the ducts with the leg extending outwardly between the ducts and having flange means on the outer edge thereof comprising relatively narrow flange panels extending towards the crosspiece at an acute included angle with respect to the leg, said external cleat means comprising a channel having a cross-panel and two opposed depending leg panels, inturned edge panels extending along fold line edges of said depending leg panels, said inturned edge panels extending inwardly into said channel at an acute included angle with respect to said leg panels, the edges of said inturned panels being spaced from each other and adapted to engage the frame flanges when said cleat means are mounted on the ducts with said fold line edges in engagement with the external peripheral surface of the ducts whereby the ducts are tightly clamped between the internal frame and said external cleat means.

4. A connector joint assembly for joining abutting sections of rectangular sheet metal ducts comprising a one piece rectangular internal frame of sheet metal conformed to the dimensions of said ducts, said internal frame being of a generally T-shaped cross section having a central leg section and crosspiece sections projecting outwardly from opposite sides of said leg section at one end thereof, a pair of outwardly projecting flanges integrally formed at the opposite end of said leg section, said crosspiece sections being engaged with the inner surfaces of the duct sections with said leg section projecting outwardly between the duct sections and said flanges being located in spaced opposed relationship to the exterior surfaces of the duct sections, a sheet metal cleat member of generally U-shaped cross section extending along each exterior side of said ducts engaging the exterior surfaces of said ducts at opposite sides of the outwardly projecting leg section of said internal frame to enclose said leg section with said cleat member, an integral inwardly projecting web on each side of said cleat member clampingly engaged between the exterior surface of the duct and the opposed flange of said internal frame, and channel-shaped end caps at each external corner of said ducts interconnecting adjacent ends of adjacent cleat members to each other to assemble said cleat members into an external frame enclosing the joint between said duct sections.

* * * * *

UNITED STATES PATENT OFFICE
CERTIFICATE OF CORRECTION

Patent No. 3,630,549          Dated December 28, 1971

Inventor(s) John A. Grimm

It is certified that error appears in the above-identified patent and that said Letters Patent are hereby corrected as shown below:

In Claim 2, Column 7, Lines 23-26, delete "panels along the external edge of the leg and extending toward the crosspiece at an acute included angle with respect to the leg, said panels being relatively narrow with respect to the crosspiece,".

Signed and sealed this 6th day of March 1973.

(SEAL)
Attest:

EDWARD M. FLETCHER, JR.          ROBERT GOTTSCHALK
Attesting Officer                Commissioner of Patents